(12) United States Patent
Suzuki et al.

(10) Patent No.: US 6,727,011 B2
(45) Date of Patent: Apr. 27, 2004

(54) FUEL CELL SYSTEM AND METHOD OF OPERATING FUEL CELL SYSTEM

(75) Inventors: Jiro Suzuki, Nara (JP); Tetsuya Ueda, Kasugai (JP); Hiroyuki Zimbo, Toyohashi (JP); Kiichi Koike, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/359,351

(22) Filed: Feb. 5, 2003

(65) Prior Publication Data

US 2003/0180584 A1 Sep. 25, 2003

(30) Foreign Application Priority Data

Feb. 8, 2002 (JP) .......................... 2002-032075

(51) Int. Cl.[7] ............................... H01M 12/00

(52) U.S. Cl. ............................. 429/9; 429/19; 429/21; 429/17; 429/20

(58) Field of Search ................ 429/9, 19, 21, 429/17, 20

(56) References Cited

FOREIGN PATENT DOCUMENTS

JP          2002056880 A  *  2/2002  ............ H01M/8/06

* cited by examiner

*Primary Examiner*—Patrick Ryan
*Assistant Examiner*—Angela J. Martin
(74) *Attorney, Agent, or Firm*—RatnerPrestia (57) ABSTRACT

A fuel cell system includes a fuel cell that supplies an oxidizer containing oxygen to a positive electrode, supplies a fuel gas containing hydrogen to a negative electrode and generates power, a battery containing at least water as an electrolyte, a hydrogen tank that stores hydrogen generated from the battery and a hydrogen pipe that supplies hydrogen in the hydrogen tank to the fuel cell.

21 Claims, 5 Drawing Sheets

FUEL CELL SYSTEM AND METHOD OF OPERATING FUEL CELL SYSTEM

BACKGROUND OF THE INVENTION

1. Field of the Invention

The present invention relates to a fuel cell system using a fuel cell and battery, and more particularly, to a fuel cell system used for self-generation including cogeneration at a household or factory, and a method of operating the same.

2. Related Art of the Invention

When generators such as an engine, gas turbine and fuel cell are used for self-generation, these generators cannot perform power control capable of speedily responding to a load, which causes excess or shortage of power. It has been known to solve excess or shortage of power produced by self-generation such as a power generation system, by connecting self-generation equipment, commercial power and a load by means of a grid connect. This system only requires an amount of power generated smaller than a peak load, and therefore it has a merit of reducing an equipment cost.

However, when power is traded with a power company through the grid connect, there is a case that a purchase price from the power company is high, while a selling price for the power company is extremely low. For example, in Japan, the purchasing price is ¥25/kW, while the selling price is ¥5/kW. For this reason, under the current price system of electric power, the economical merit of self-generation for the purpose of solving the problem of excess or shortage of self-generation decreases as the amount of power traded increases.

Other means of solving power excess or shortage includes, for example, means of storing power using batteries (e.g., Japanese Patent Laid-Open No. 05-182675). The problem of power excess or shortage is solved by charging the excessive power in a battery when the amount of power generated by a fuel cell exceeds its load, and by discharging and supplying power from the battery to the load when the amount of power generated by the fuel cell falls below the load. The disclosure of Japanese Patent Laid-Open No. 05-182675 is incorporated herein by reference in its entirety.

Since this method does not involve trading of power in excess or shortage, the economical efficiency of self-generation is improved. However, a large-volume battery is required to cover a peak load, which produces a new problem of increasing a cost of equipment. Therefore, a method of employing a grid connect simultaneously with this method, reducing the size of equipment and increasing an operation rate of the equipment while reducing the amount of power traded with a power company is also often adopted.

On the other hand, a fuel cell is now a focus of attention as a high efficiency generator. Especially, a polymer electrolyte fuel cell, which operates at a low temperature of 70° C., can quickly increase or decrease the amount of power generated and its speed of response is so high that it is expected to be used in electric vehicles when hydrogen is used as a fuel gas.

However, self-generation requires hydrogen to be generated as a fuel gas for a fuel cell using natural gas or petroleum as a raw material and it is difficult to control the amount of hydrogen generated in this hydrogen generation process at high speed. Thus, even if the power generation section is a highly responsive high polymer type fuel cell, it is difficult to operate and control the entire system in accordance with load variations.

Due to technical problems of the generator or battery, or problems with the fee system, etc., excess or shortage in the amount of power generated of self-generation has not been solved. This accounts for the fact that self-generation using a fuel cell is widely used only among hotels and semiconductor factories where there are fewer load variations and self-generation using a fuel cell is conventionally not used at households and stores where there are drastic load variations.

One of causes for power excess or shortage in self-generation using a fuel cell is slow heat response in hydrogen generation process control. The speed of response of control over the amount of power generated of the fuel cell itself is high, but increase/decrease or fluctuations in hydrogen generation by transforming carbon hydride into hydrogen cannot be accelerated.

Attempting to use a battery, especially a flood type lead acid battery for a fuel cell to solve the problem of responsivity in particular will result in technical problems of the battery itself. That is, if self-generation is performed at a household, power load fluctuates frequently and drastically, charging/discharging takes place several tens of times to several thousands of times a day and since its depth of discharge is large, thereby intensifying the deterioration of the battery.

Furthermore, due to an overcharge reaction before and after full charging, the battery produces hydrogen, which is hard to deal with. Hydrogen generated is normally discharged into an atmosphere, but for the purpose of the security, it is necessary to diffuse and so on, and then discharge it into an atmosphere in an extremely low-concentration. Thus, this equipment for diffusion and discharge entails a problem of high cost.

On the other hand, to prevent generation of hydrogen, a sealed lead acid battery may be used, but it is more expensive than a flood type, inferior in volumetric efficiency or economical efficiency, which still results in a high cost.

Moreover, an overcharge reaction reduces the amount of water as the electrolyte of the battery, and reduces the battery capacity, causing a problem of reducing the efficiency of the battery. On the other hand, there are also additional problems with the fuel cell, which requires a solution. That is, the problem is that carbon monoxide (hereinafter referred to as "CO") increased when the amount of hydrogen generated in the hydrogen generation process is increased/decreased may poison the catalyst of the fuel cell. Solving this problem is also required to secure the responsivity of the power generation system.

SUMMARY OF THE INVENTION

The present invention solves the above-described problems and it is an object of the present invention to provide a low-cost, highly responsive fuel cell system capable of facilitating the handling of a battery which works in conjunction with a fuel cell, and a method of operating the same.

The 1st aspect of the present invention is a fuel cell system comprising:

a fuel cell for generating power, that (1) is supplied an oxidizer containing oxygen to a positive electrode and (2) is supplied a fuel gas containing hydrogen to a negative electrode;

a battery including at least water as an electrolyte; and a hydrogen supply channel that supplies hydrogen generated from said battery to said fuel cell.

The 2nd aspect of the present invention is the fuel cell system according to 1st aspect, further comprising a hydrogen storage section in said hydrogen supply channel, which stores hydrogen generated from said battery.

The 3rd aspect of the present invention is the fuel cell system according to 1st or 2nd aspect, wherein said hydrogen supply channel is connected to the negative electrode of said fuel cell.

The 4th aspect of the present invention is the fuel cell system according to 1st aspect, further comprising an oxygen supply channel that extracts oxygen generated from said battery.

The 5th aspect of the present invention is the fuel cell system according to the 4th aspect, further comprising an oxygen storage section provided at a midpoint in said oxygen supply channel, which stores oxygen generated from said battery.

The 6th aspect of the present invention is the fuel cell system according to the 4th aspect, wherein said oxygen supply channel is connected to the positive electrode of said fuel cell.

The 7th aspect of the present invention is the fuel cell system according to the 4th aspect, wherein said oxygen supply channel is connected to the negative electrode of said fuel cell.

The 8th aspect of the present invention is the fuel cell system according to the 4th aspect, further comprising:

fuel gas generating means of generating said fuel gas by allowing fuel containing at least carbon to produce a steam reforming reaction with water; and CO reducing means of reducing carbon monoxide contained in said fuel gas by converting the carbon monoxide into carbon dioxide through oxidation catalyst, wherein said oxygen supply channel is connected to said CO reducing means.

The 9th aspect of the present invention is the fuel cell system according to the 1st aspect, further comprising a water supply channel that supplies water generated during power generation by said fuel cell to said battery.

The 10th aspect of the present invention is the fuel cell system according to any one of the 1st or 4th aspect, wherein said hydrogen and/or said oxygen is generated from said battery by allowing said battery to produce an overcharge reaction.

The 11th aspect of the present invention is the fuel cell system according to the 10th aspect, wherein said overcharge reaction is produced through output from said fuel cell.

The 12th aspect of the present invention is the fuel cell system according to the 10th aspect, wherein said overcharge reaction is produced through power from an external source in grid connect with said fuel cell.

The 13th aspect of the present invention is the fuel cell system according to the 1st aspect, wherein said battery is a flood type lead acid battery.

The 14th aspect of the present invention is the fuel cell system according to the 1st aspect, wherein said fuel cell is any one of polymer electrolyte type, direct methanol type or solid electrolytic type.

The 15th aspect of the present invention is a method of operating a fuel cell system comprising the steps of:

(a) supplying an oxidizer containing oxygen to a positive electrode of said fuel cell, supplying a fuel gas containing hydrogen to a negative electrode of said fuel cell and generating power;

(b) allowing a battery including at least water as an electrolyte to produce overcharge reaction, thereby to generate from said battery at least hydrogen for supplying to said fuel cell.

The 16th aspect of the present invention is the method of operating a fuel cell system according to the 15th aspect, wherein said overcharge reaction is produced when the output of said fuel cell is not insufficient with respect to a load of said fuel cell.

The 17th aspect of the present invention is the method of operating a fuel cell system according to the 15th aspect, wherein the step (a) includes supplying said hydrogen when the output of said fuel cell is not insufficient with respect to the load of said fuel cell.

The 18th aspect of the present invention is the method of operating a fuel cell system according to the 17th aspect, wherein the step (a) includes supplying said hydrogen when operation of said fuel cell is started.

The 19th aspect of the present invention is the method of operating a fuel cell system according to the 15th or 16th aspect, further comprising a step of supplying oxygen generated together with said hydrogen from said battery through said overcharge reaction to said fuel cell.

The 20th aspect of the present invention is the method of operating a fuel cell system according to the 15th aspect, further comprising a step of supplying water generated during power generation by said fuel cell as electrolytic water to said battery.

The 21st aspect of the present invention is the method of operating a fuel cell system according to the 15th aspect, wherein the step (b) includes producing said overcharge reaction through the output from said fuel cell or power of an external source in grid connect with said fuel cell.

DESCRIPTION OF SYMBOLS

100 . . . Fuel cell
101 . . . Electrolytic film
102 . . . Hydrogen electrode (negative electrode)
103 . . . Air electrode (positive electrode)
104 . . . Separator
105 . . . Hydrogen channel
106 . . . Air channel
107 . . . Cooling water channel
108 . . . Positive electrode current collector plate
109 . . . Negative electrode current collector plate
110 . . . Insulating plate
111 . . . End plate
112 . . . External load
201 . . . Electrolyzer
202 . . . Electrolyte
203 . . . Positive electrode plate
204 . . . Negative electrode plate 205 . . . Separator
206 . . . Oxygen gas chamber
207 . . . Hydrogen gas chamber
208 . . . Hydrogen exhaust plug
209 . . . Oxygen exhaust plug
210 . . . Cover
211 . . . Positive electrode terminal
212 . . . Negative electrode terminal
213 . . . Water refilling plug
214 . . . Electrolyte level detection section
215 . . . Hydrogen tank
216 . . . Oxygen tank
220 . . . Hydrogen pipe
230, 250, 260 . . . Oxygen pipe
240 . . . Water refilling pipe
300 . . . Reformer
301 . . . Carburetor
302 . . . Reforming catalyst
303 . . . Burner
304 . . . Fuel pipe
305 . . . Water pipe
306 . . . Exhaust fuel gas pipe
307 . . . Exhaust section
308 . . . Air blower
309 . . . Gas flow rate control section
310 . . . Nitrogen bomb
400 . . . Shifter
401 . . . Shifting catalyst
402 . . . Preheater
500 . . . CO purification section
501 . . . Air pump
502 . . . CO purificating catalyst
503 . . . Preheater
504 . . . Fuel gas pipe
505 . . . Bypass
600 . . . Total enthalpy heat exchanger
601 . . . Air blower
701 . . . Condenser
702 . . . Condenser
703 . . . Condensed water tank
704 . . . Water pump
705 . . . Pump
801 . . . Inverter section
802 . . . Load
803 . . . Commercial power supply
804 . . . Charging/discharging control section
805 . . . Voltmeter
901 . . . Primary cooling water circulation channel
902 . . . Heat exchanger
903 . . . Primary cooling water circulation pump
904 . . . Secondary cooling water circulation channel
905 . . . Hot water tank
906 . . . Secondary cooling water circulation pump
907 . . . Hot water load

DESCRIPTION OF THE DRAWINGS

The following embodiments of the present invention will be explained by referring to FIGS. 1 to 5.

Figure 1:
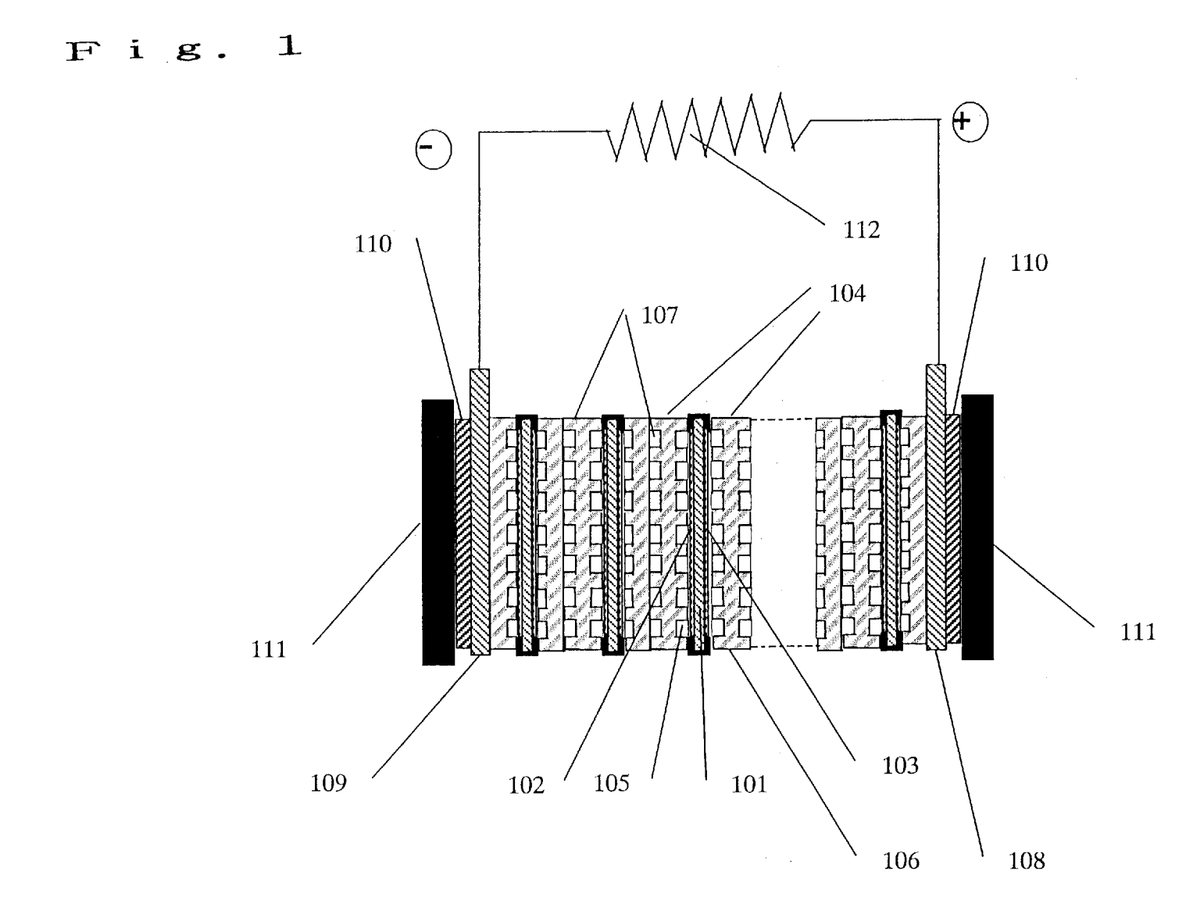
FIG. 1 is a cross-section of a fuel cell according to Embodiments 1 to 3 of the present invention.

FIG. 1 shows a cross-section of a fuel cell 100 made up of multiple power generation cells stacked in series. A high polymer electrolytic film 101 is located in the center of the cell and a hydrogen electrode (negative electrode) 102, which is a mixture of a Pt catalyst and carbon powder and an air electrode (positive electrode) 103 are placed on both sides thereof. Carbon separators 104 on the both sides of the electrodes are provided with a hydrogen channel 105 and an air channel 106, and cooling water channels 107 are further formed on both sides thereof. An electric cell having an electromotive force of approximately 0.8 V in such a configuration is formed. Its voltage is increased by stacking many cells in series. Both ends of the stacked cells are a positive current collector plate 108 and a negative current collector plate 109. Outside both current collector plates are end plates 111 through insulating plates 110 and the two end plates 111 are mutually connected with bolts (not shown) in such a way that the cells are closely pressed against each other.

Hydrogen of the fuel gas is dissociated into hydrogen ions $H^+$ and electrons by the catalyst Pt of the hydrogen electrode 102 and $H^+$ ions pass through the electrolytic film 101 and move to the air electrode 103. On the other hand, electrons circulate through an external load 112 and reach the air electrode 103. Then, electrons are supplied to the Pt catalyst of the air electrode 103, associating $H^+$ with oxygen to generate water. Continuation of propagation of these electrons and hydrogen ions corresponds to a power generating state.

However, when the Pt catalyst of the fuel cell adsorbs a trace quantity of CO, it has an undesirable nature that its power generation output is reduced. Since the Pt catalyst operates at a low temperature, this problem is especially serious to a solid high polymer fuel cell, which is prone to CO adsorption. Therefore, more than 20 ppm CO should not be contained in hydrogen generated in a hydrogen generation process whereby transformed hydrogen is generated from a natural gas, etc., which will be described later.

Figure 2:
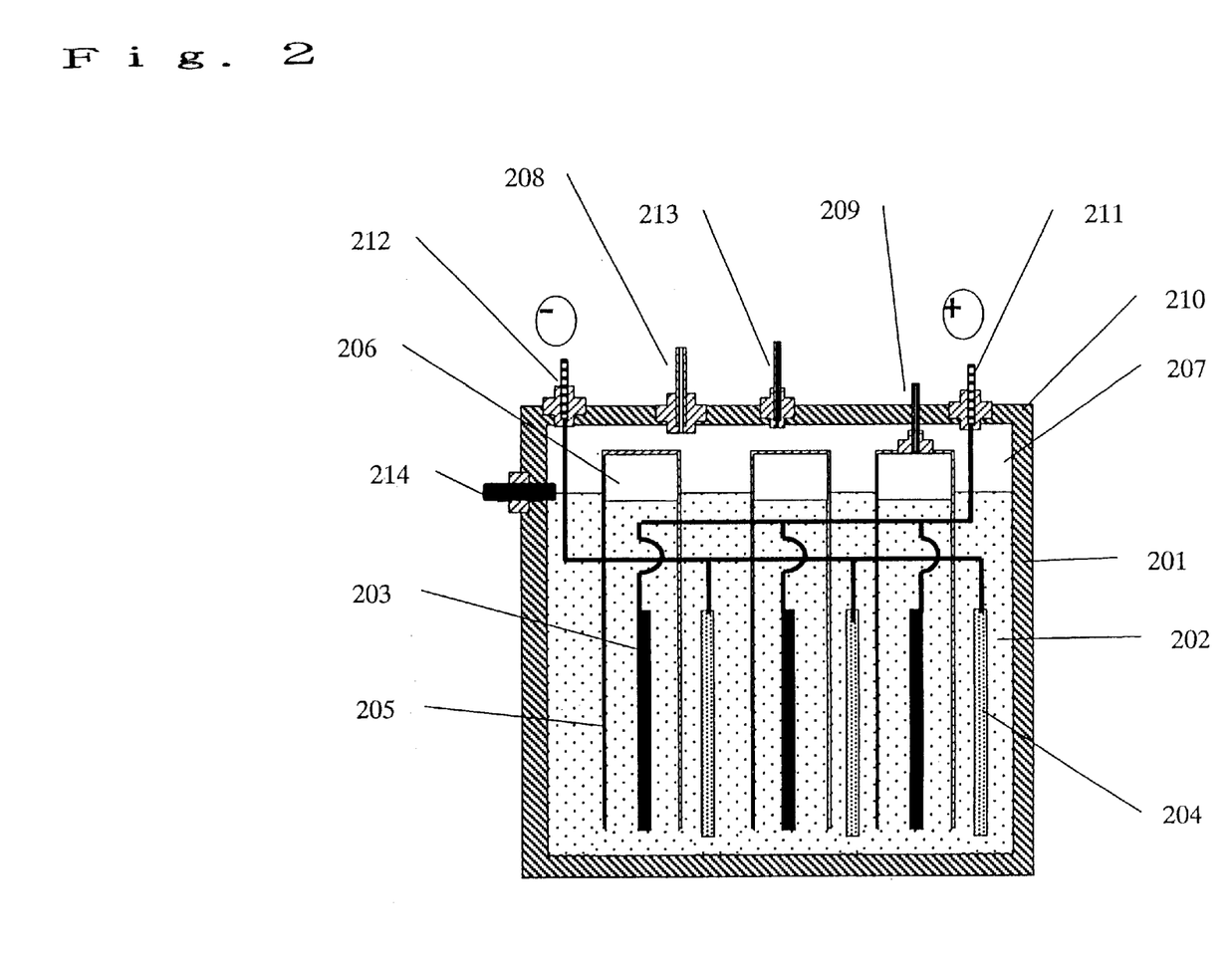
FIG. 2 is a cross-sectional view of a lead acid battery according to Embodiments 1 to 3 of the present invention.

FIG. 2 shows a cross section of a flood type lead acid battery 200. An electrolyzer 201 contains an electrolyte 202, which is an aqueous solution of sulfuric acid, and a positive electrode plate 203 and a negative electrode plate 204 are provided therein. A separator 205 for preventing short-circuit between the electrodes is provided between the positive electrode plate 203 and the negative electrode plate 204. Above the positive electrode plate 203 is an oxygen gas chamber 206, which is partitioned from a hydrogen chamber 207 above the negative electrode plate 204. Though not shown, the oxygen gas chambers 206 containing their respective positive electrode plates 203 communicate with each other. As outlets for oxygen and hydrogen produced by an overcharge reaction, a cover 210 is provided with a hydrogen exhaust plug 208 and an oxygen exhaust plug 209. The cover 210 is also provided with a positive electrode terminal 211 and a negative electrode terminal 212. Furthermore, the cover 210 is also provided with a water refilling plug 213 and a level detector 214 of detecting a level of electrolyte 202.

Then, a charging/discharging reaction mechanism will be explained. During discharging, lead peroxide of the positive electrode plate 203 receives electrons, reacts with sulfuric acid to become lead sulfate. Lead at the negative electrode plate 204 reacts with sulfuric acid to become lead sulfate and discharges electrons.

More specifically, the discharging reaction of the positive electrode plate 203 is expressed by the following formula:

$$PbO_2 + 4H^+ + SO_4^{2-} + 2e^- \rightarrow PbSO_4 + 2H_2O \quad \text{(Chemical formula 1)}$$

On the other hand, the discharging reaction of the negative electrode plate 204 is expressed by the following formula:

$$Pb + SO_4^{2-} \rightarrow PbSO_4 + 2e^- \quad \text{(Chemical formula 2)}$$

During charging, lead sulfate of the positive electrode plate 203 reacts with water to produce lead peroxide and sulfuric acid and dissociates electrons. Lead sulfate at the negative electrode plate 204 receives electrons to become lead and sulfuric acid.

More specifically, the charging reaction of the positive electrode plate 203 is expressed by the following formula:

$$PbSO_4 + 2H_2O \rightarrow PbO_2 + 4H^+ + SO_4^{2-} + 2e^- \quad \text{(Chemical formula 3)}$$

On the other hand, the charging reaction at the negative electrode plate 204 is expressed by the following formula:

$$PbSO_4 + 2e^- \rightarrow Pb + SO_4^{2-} \quad \text{(Chemical formula 4)}$$

During charging of the battery 200, sulfuric acid of large specific gravity sinks toward the bottom of the electrolyzer 201, producing a concentration difference in the electrolyte 202. The concentration difference in the electrolyte 202 produces a problem that the electrodes deteriorate and the capacity of the battery decreases, which prevents the battery from standing long use. In an alternative embodiment, a pump is tend to provided outside and to stir the electrolyte 202, but this method may make the battery more complicated, and not economical.

When lead sulfate becomes scarce at both electrodes, charging finishes. Further continuing to apply a voltage to the electrodes will cause an overcharged state in which electrolysis of water produces oxygen at the positive electrode 203 and hydrogen at the negative electrode 204. Both reactions actually coexist during the transition from a charged state to an overcharged state and during charging, electrolysis of water also advances as a sub-reaction.

More specifically, the overcharge reaction at the positive electrode plate 203 is expressed by the following formula:

$$H_2O \rightarrow \tfrac{1}{2}O_2 + 2H^+ + 2e^- \quad \text{(Chemical formula 5)}$$

On the other hand, the overcharge reaction at the negative electrode plate 204 is expressed by the following formula:

$$2H^+ + 2e^- \rightarrow H_2 \quad \text{(Chemical formula 6)}$$

Thus, during charging of the lead acid battery, hydrogen and oxygen are produced by an overcharge reaction, processing of which is a problem. Hereunder, embodiments of the present invention, which perform such processing, will be explained.

(Embodiment 1)

Figure 3:
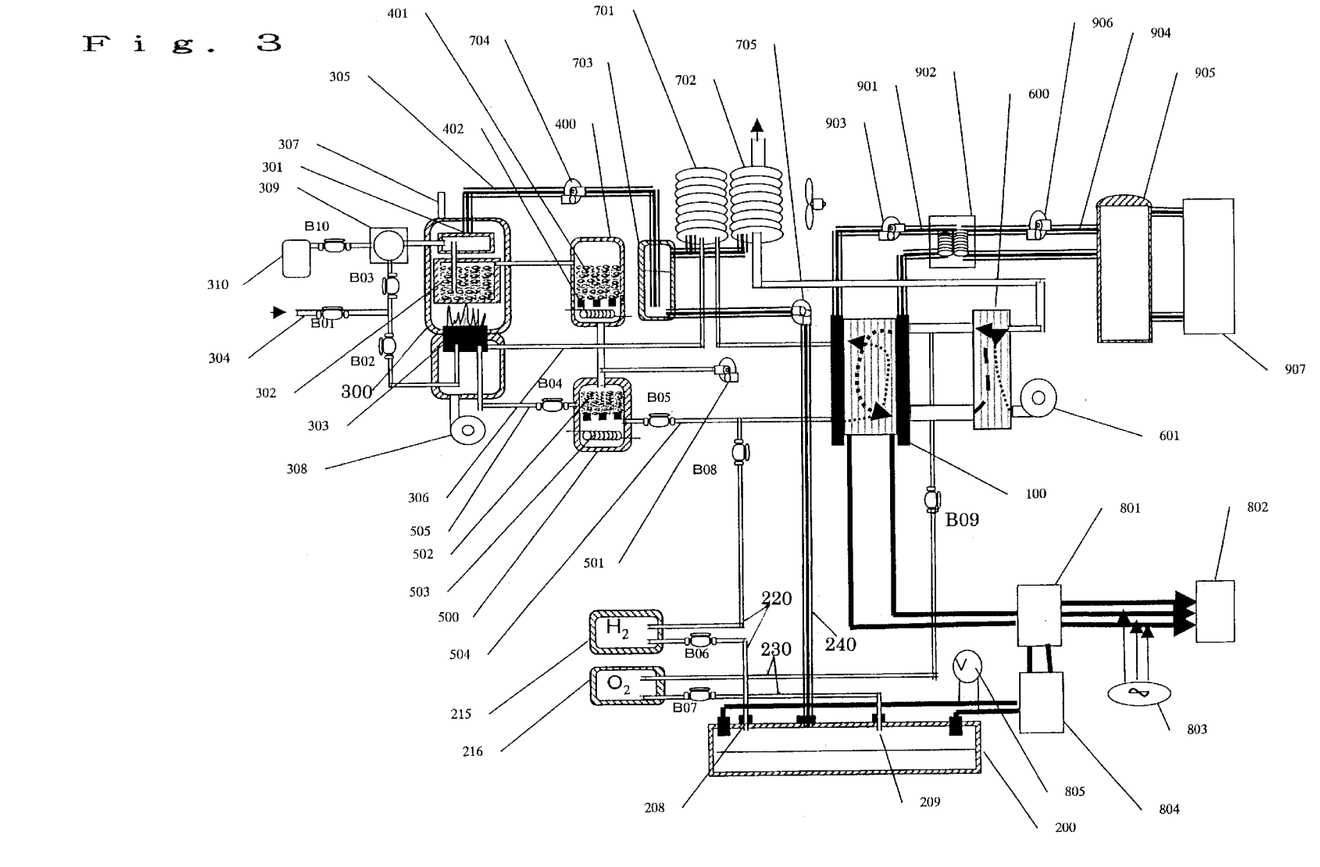
FIG. 3 is a block diagram of a fuel cell system according to Embodiment 1 of the present invention.

FIG. 3 is a block diagram of a fuel cell system according to an embodiment of the present invention. The components common between FIG. 1 and FIG. 2 are assigned the same reference numerals and detailed explanations thereof will be omitted. A hydrogen generation section for generating an oxigen-rich reformed gas, which is a fuel gas of the present invention, consists of three reaction sections of a reformer 300, a transformation section 400 and a CO purification section 500. The reformer 300 is constructed of a carburetor 301, a reforming catalyst tank 302 and a burner 303. A natural gas fuel pipe 304 and a water pipe 305 are connected to the reforming catalyst tank 302 through the carburetor 301. The burner 303 is provided with the fuel pipe 304 for supplying a natural gas, an exhaust fuel gas pipe 306 for supplying an exhaust fuel gas, an ignition electrode (not shown), an exhaust section 307, an air blower 308 for combustion air and a gas flow rate control section 309. Furthermore, the fuel pipe 304 is provided with a nitrogen bomb 310 through a valve B10.

The transformation section 400 connected downstream of the reformer 300 is provided with a transformation catalyst 401 containing a platinum catalyst and preheater 402. CO purification reaction air is injected into the CO purification section 500 using an air pump 501. Furthermore, inside the CO purification section 500 are a CO purificating catalyst 502 composed of mordenite-Pt, etc., and a preheater 503 that preheats the CO purificating catalyst 502. The downstream of the CO purification section 500 and the fuel cell 100 are connected using a fuel gas pipe 504 and the CO purification section 500 communicates with the burner 303 through a bypass 505.

An atmosphere introduced from the outside by an air blower 601 passes through a total enthalpy heat exchanger 600 and is supplied to the air channel 106 of the fuel cell 100. Inside the total enthalpy heat exchanger 600, total enthalpy heat exchange is performed between the atmosphere and exhaust air from the fuel cell 100 through a hydrophilic film (not shown) having a multi-layer configuration. The exhaust fuel gas of the fuel cell 100 is output to the burner 303 connected to the exhaust fuel gas pipe 306 through a condenser 701. The exhaust air output from the outlet of the total enthalpy heat exchanger 600 is exhausted through the condenser 702. The lower sections of the condensers 701 and 702 communicate with the condensed water tank 703, and the condensed water tank 703 and reformer 300 are connected through a water pump 704.

The DC circuit of the fuel cell 100 is connected to a load 802 through an inverter section 801. The inverter section 801 incorporates a booster type DC/DC converter and a DC/AC inverter (not shown) and the DC output of the 50 V fuel cell is converted to an AC 200 V, connected to a commercial power supply 803 by a grid connect and further connected to the battery 200. The DC channel is provided with a charging/discharging control section 804 to control the charging of the battery 200. The charging/discharging control section 804 is provided with a voltmeter 805 to detect an overcharged state of the battery 200.

A hydrogen pipe 220 that connects the hydrogen gas chamber 207 of the battery 200 and the hydrogen channel 105 of the fuel cell 100 shown in FIG. 2 is provided with a valve B06 and a hydrogen tank 215 at some midpoint. Likewise, an oxygen pipe 230 that connects the oxygen gas chamber 206 of the battery 200 and the air channel 106 of the fuel cell 100 shown in FIG. 2 is provided with a valve B07 and an oxygen tank 216. A condensed water tank 703 and the electrolyzer 201 of the battery 200 shown in FIG. 2 are connected via a water refilling pipe 240 having a pump 705.

Reference numeral 901 denotes a primary cooling water circulation channel formed between the fuel cell 100 and a heat exchanger 902 and is provided with a primary cooling water circulation pump 903. The primary cooling water circulation channel 901 and the secondary cooling water circulation channel 904 exchange heat using the heat exchanger 902. In the secondary cooling water circulation channel 904, a heat medium is circulated between the heat exchanger 902 and a hot water tank 905 using a secondary cooling water circulation pump 906. Hot water from the hot water tank 905 is used for a hot water load 907 such as a bath and heating.

A starting operation of the fuel cell system of this embodiment in the above-described configuration and its operation during power generating operation will be explained below and an embodiment of the method of operating the fuel cell system of the present invention will be explained. With the valves B01 and B02 left open, a natural gas is supplied to the burner 303 through the fuel pipe 304. At the same time, the burner 303 is supplied with air for combustion by the air blower 308 and ignited by the ignition electrode.

Before and after this process, a transformation catalyst 401 and a CO purificating catalyst 502 are heated to predetermined temperatures by the respective preheaters 402 and 503 of the transformation section 400 and CO purification section 500. Furthermore, with the valve B10 left open, nitrogen is supplied to the reformer 300 from the nitrogen bomb 310.

When the temperature of the entire hydrogen generation section reaches or exceeds 100° C., water is supplied from the condensed water tank 703 to the carburetor 301. Furthermore, with the valve B10 closed and with the valve B02 left open, a natural gas is supplied from the fuel pipe 304 to the reforming catalyst 302. The natural gas and water are transformed to an oxygen-rich reformed gas through a reforming reaction. This reformed gas contains 10% CO due to a sub-reaction and if the reformed gas is supplied to the fuel cell 100 as is, the catalyst of the hydrogen electrode 102 is poisoned and power generation performance is reduced. For this reason, CO is reduced to 1% or less through a shift reaction of the transformation section 400 and the CO purification section 500 connected downstream of the transformation section 400 is allowed to produce a CO purification reaction.

Since the CO concentration of the reformed gas obtained through the reforming reaction remains high until the catalyst temperatures of the transformation section 400 and the CO purification section 500 are totally stabilized, this reformed gas should be prevented from being supplied to the fuel cell 100. That is, with the valve B04 left open, reformed hydrogen is supplied from the bypass 505 to the burner 303 for burning to support an endothermic reaction of the reforming catalyst 302. When the reforming catalyst 302, transformation catalyst 401 and CO purificating catalyst 502 become stabilized at steady temperatures of approximately 700° C., 350° C. and 150° C., respectively, a reformed gas having an approximate composition of $H_2$: 75%, $CO_2$: 20% and CO: 10 ppm is output from the CO purification section 500. Until this stage, the fuel cell 100 is preheated up to 70° C. through a heat circulation by the hot water tank 905. The valve B04 of the bypass 505 is closed and the valve B05 of the fuel gas pipe 504 is opened. The reformed gas as the fuel gas flows through the hydrogen channel 105 of the fuel cell 100. At this time, outside air is introduced by the air blower 601 and supplied through the total enthalpy heat exchanger 600 to the air channel 106 of the fuel cell 100. Inside the fuel cell 100, hydrogen supplied to the hydrogen electrode 102 reacts with oxygen in the air supplied to the air electrode 103 to generate power.

An experimental machine with power generation output of 1 kW output took 30 minutes after the start of operation until power generation was started. During this period, the generator cannot supply a required amount of power generated of the load 802 such as a TV or air-conditioner, and therefore the commercial power supply 803 needs to be used. Of course, an independent power supply cannot obtain power for starting, and therefore the battery 200 is indispensable.

The fuel gas inside the fuel cell 100 flows while consuming hydrogen in the hydrogen channel 105. When all hydrogen is consumed for power generation at the end of the hydrogen channel 105, the partial pressure of hydrogen of the downstream of the hydrogen electrode 102 decreases and the power generation efficiency deteriorates. For this reason, the hydrogen utilization rate of the fuel cell 100 is set to about 80%. The exhaust fuel gas containing the remaining about 20% of hydrogen is exhausted from the fuel cell 100, dehydrated at the condenser 701 and then supplied to the burner 303. Hereafter, the reformer 300 is heated with combustion heat of the exhaust fuel gas. Thus, the valve B02 is closed to stop the supply of the natural gas to the burner 303.

On the other hand, the air utilization rate of the air to be supplied to the fuel cell 100 is also set to about 60% for the same reason as above. The exhaust air from the fuel cell 100 contains steam by a power generation reaction and remaining oxygen. While this exhaust air is passing through the total enthalpy heat exchanger 600, fresh air, which is outside air sent from the air blower 601, is given humidity and heat. Furthermore, the exhaust air exiting the total enthalpy heat exchanger 600 is further dehydrated by the condenser 702 and exhausted out of the system. The water separated from the exhaust fuel gas and the exhaust air is collected into the condensed water tank 703 and recycled for a reforming reaction by the reformer 300.

The power generation efficiency in the fuel cell 100 is 40% and the rest of energy becomes heat. The fuel cell 100 heats hot water of the hot water tank 905 by operation of the primary cooling water circulation pump 903 through the primary cooling water circulation channel 901, heat exchanger 902 and secondary cooling water circulation channel 904. This hot water is used for hot water supply or heating, etc.

When a power load is drastically increased in such a situation, drastically increasing the amount of hydrogen generated will cause the temperature of a hydrogen generation catalyst of the reformer catalyst 302, etc., to fluctuate, increasing CO contained in the reformed gas. Thus, the amount of hydrogen generated should be increased gradually. In the meantime, the amount of power generated remains insufficient.

Furthermore, when the power load is drastically decreased, the amount of natural gas supplied from the fuel pipe 304 is decreased. However, since the fuel gas remains in the fuel cell 100, power generation is not stopped immediately and unavoidable excessive power is generated. Furthermore, the fuel cell 100 has the nature that when its output is reduced to 30% or less of the maximum rated output, the power generation efficiency deteriorates.

Therefore, when the load falls below about 30%, it is necessary to select whether to generate excessive power, stop the fuel cell 100 or continue operation under the previous condition.

When excessive power is generated, excessive power is stored by charging in the battery 200. At this time, even after the battery 200 is charged to the full, an overcharge reaction is carried out through an operation of applying power continuously. Through the overcharge reaction, the battery 200 separates water, which is the electrolyte 202 through electrolysis to generate oxygen from the positive electrode plate 203 and hydrogen from the negative electrode plate 204. Then the valves B06 and B07 are opened and hydrogen and oxygen generated from the battery 200 are stored in the hydrogen tank 215 and oxygen tank 216 respectively. That is, excessive power is used for electrolysis of water inside the battery 200 and power is converted to hydrogen energy and stored.

By the way, such hydrogen storage can also be performed economically using the following method. That is, an overcharge reaction can also be executed when the fuel cell 100 is stopped. When the fuel cell 100 is stopped, it is desirable for safety reasons to substitute hydrogen in all channels of the fuel cell system by nitrogen in the nitrogen bomb 310. Therefore, the moment the supply of the natural gas is stopped, the valve B10 is opened and hydrogen inside is purged with nitrogen for a predetermined time. The concentration of hydrogen inside the fuel cell 100 and amount of power generated decrease gradually to 0 at last. The voltage of this power is unstable and it is hard to use, and therefore it would be wasted conventionally, but this embodiment stores the power by charging in the battery 200. It can also be stored as hydrogen through an overcharge reaction.

Such hydrogen purge is carried out for the purpose of preventing combustible hydrogen and oxygen from mixing together inside the channels of the fuel cell system. Thus, it is also possible to use an oxygen-free gas such as water vapor or exhaust air from the burner generated in the reformer 300 as a purging gas.

Moreover, it is also possible to perform charging or overcharge reaction economically using the following means. Using low-price midnight electric power as a commercial power supply 803 in a grid connect, the battery 200 is charged or overcharged and energy is stored in the battery 200 and hydrogen tank 215. Complementing a temporary shortage of power during daytime using this hydrogen would make it possible to operate the fuel cell system more economically.

The hydrogen or oxygen stored in this way is used in the event of a power shortage immediately after the fuel cell 100 is started or when load is increased drastically. This is because even if an attempt is made to drastically increase the amount of power generated by drastically increasing the amount of natural gas and water supplied in the hydrogen generation process, it is impossible to achieve a temperature balance among each catalyst group used for the reformer 300, transformation section 400, the purification section 500 making up the hydrogen generation section, increasing CO contained in the reformed gas supplied to the fuel cell 100, and use this reformed gas for power generation as is.

Until the temperature condition of the reformed gas is put into place, power generation of the fuel cell 100 gets into full swing and the amount of power generated increases, a power shortage in the event of drastic increase in the load is supplemented with discharging from the battery 200 and the power from the fuel cell 100 generated with hydrogen stored in the hydrogen tank 215. In this case, the shortage in the power generation capacity of the fuel cell 100 is supplemented using the power stored in the battery 200 first. Then, when the remaining capacity of the battery 200 decreases, the valve B08 is opened, hydrogen in the hydrogen tank 215 is added to a fuel gas, supplied to the fuel cell 100 to increase power output. Hydrogen stored in the hydrogen tank 215 includes not only intentionally stored hydrogen but also unavoidably generated hydrogen, and therefore this is more economical than purchasing the commercial power supply 803. Furthermore, since the shortage in the capacity of the battery 200 is supplemented by the amount of power generated of the fuel cell 100 corresponding to hydrogen stored, it is possible to achieve the effect of reducing the depth of discharge of the battery 200 and increasing the durability of the battery 200.

Moreover, it is also possible to achieve the effect of increasing output using oxygen stored. When there is a shortage of power generation output, if oxygen stored in the oxygen tank 216 is used instead of air or mixed with air and supplied to the fuel cell 100, the power generation output can be increased. This is because the oxygen partial pressure of the air electrode 103 of the fuel cell 100 increases. Adding this method will further make it possible to supplement the power shortage for a larger load peak.

Furthermore, when pure hydrogen and oxygen generated through electrolysis of water of the battery 200 are supplied to the fuel cell 100 as a fuel gas and oxidizer, this purifies CO and other various organic matters which have been adsorbed by an electrode catalyst and which causes deterioration of performance. This is because when the $CO_2$ partial pressure at the hydrogen electrode 102 decreases, oxidation of CO and various hydrocarbons is promoted. Furthermore, when the concentration of oxygen increases, reaction preventing matters stuck to the air electrode 103 are easily oxidized and cleaned. For this reason, if power is generated using pure hydrogen and oxygen during power generation using a reformed gas and air, the electrode is always cleaned and it is possible to prevent deterioration of power generation output for a long period of time.

The capacity of the battery 200 and the capacities of the hydrogen tank 215 and the oxygen tank 216 should be determined according to a load variation pattern of power consumption by the user and the greater the load variation, the greater amount of power and hydrogen should be stored. However, it is preferable to increase the amount of power and hydrogen stored depending primarily on the capacity of the battery 200 and secondarily on the role of hydrogen storage. This is because while the power charging/discharging efficiency of the battery 200 is 90%, in the case where water is converted to hydrogen, energy is stored and energy is converted to electric power by the fuel cell 100 again, the efficiency is reduced to about 30 to 40%. Therefore, it is economical to implement the hydrogen storage as complementary energy storing means to use unavoidably generated hydrogen and prevent a reduction of the depth of discharge of the battery 200.

In this way, since this embodiment can always process hydrogen safely, it is possible to adopt a more economical flood type lead acid battery than a sealed lead acid battery.

This embodiment uses generation of hydrogen in a more positive manner. When sulfuric acid with large specific gravity is deposited at the bottom of the electrolyzer 201 during charging of the battery 200, the charging capacity decreases and its durability deteriorates due to variations in concentration of the electrolyte 202. However, if an overcharge reaction is carried out intentionally as in the case of this embodiment, a great quantity of oxygen at the positive electrode plate 203 and hydrogen at the negative electrode plate 204 are generated and these oxygen and hydrogen rise as bubbles inside the sulfuric acid electrolyte 202 and stir the liquid. This has the effect of reducing differences in the concentration of sulfuric acid. Periodically repeating this operation improves the durability of the battery 200 and prevents a reduction of the charging capacity in a short period.

Furthermore, a reduction of the quantity level of the electrolyte 202 of the battery 200 is detected by the level detection section 214 and condensed water generated during power generation by the fuel cell 100 is supplied from the condensed water tank 703 to the battery 200 by the pump 705. The condensed water of the fuel cell 100 is generated by a reaction of hydrogen with oxygen and is of high purity, and therefore it can fully satisfy the performance as the refilling water of the battery 200. This can avoid a complicated procedure of refilling the electrolyte of the flood type lead acid battery and at the same time constantly keep the quantity level of the electrolyte at an appropriate level and thereby improve the durability of the battery significantly.

By the way, it is also possible to detect the voltage value from the voltmeter 805 and the status of the load 802 and perform the above-described operations of overcharge reaction and supply of hydrogen and oxygen automatically based on these statuses or it is also possible for the user to observe the status of each section and manually adjust the charging/discharging control section 804 and each valve. The same thing will apply to the following embodiments.

(Embodiment 2)

Figure 4:
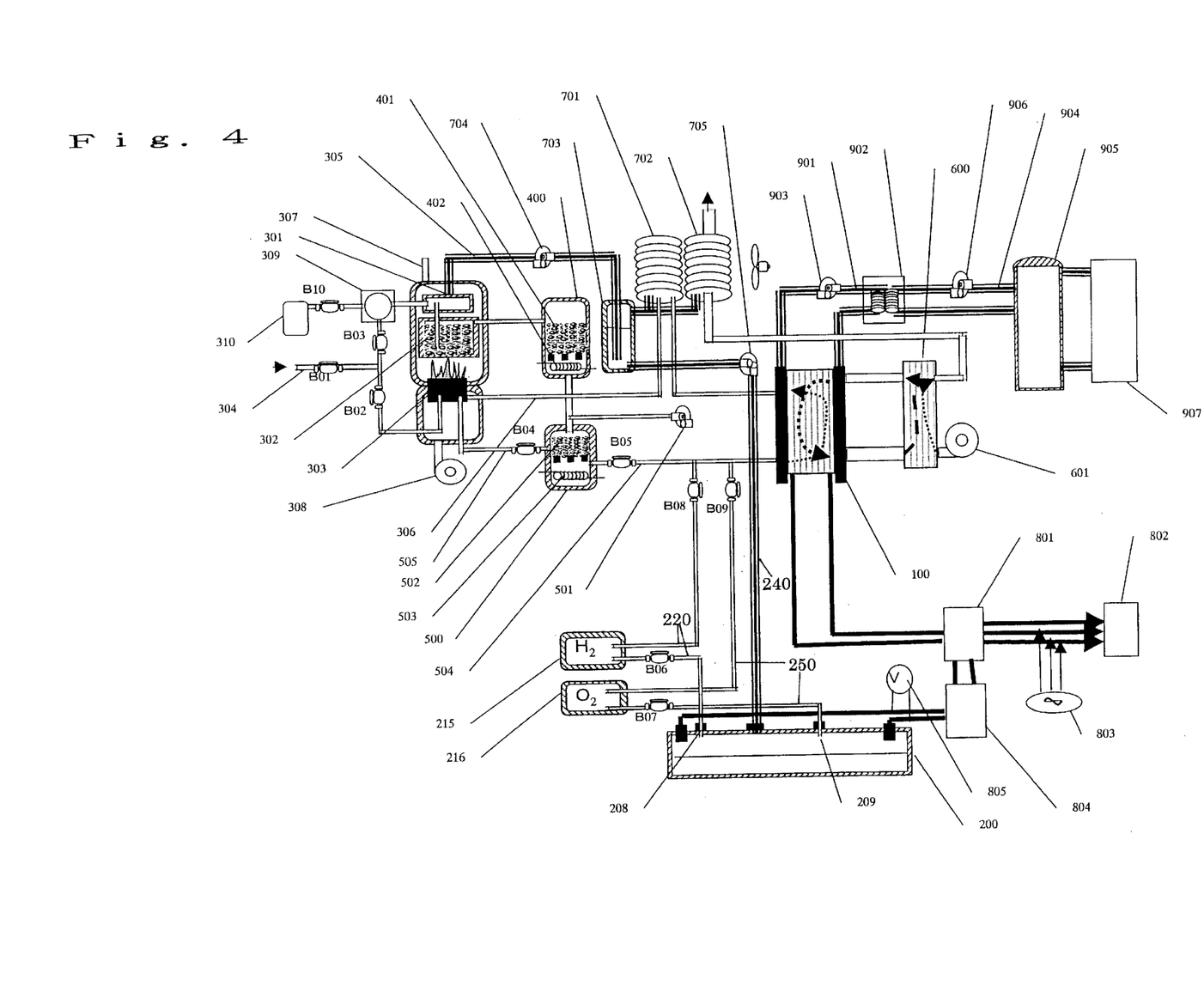
FIG. 4 is a block diagram of a fuel cell system according to Embodiment 2 of the present invention.

FIG. 4 shows a block diagram of Embodiment 2. However, the same components as or components equivalent to those in FIG. 3 are assigned the same reference numerals and detailed explanations thereof will be omitted. In Embodiment 1, the outlet of the oxygen tank 216 is connected between the air blower 601 and fuel cell 100 and oxygen is supplied to the air channel 106 of the fuel cell 100. Embodiment 2, however, is different in that an oxygen pipe 250 is connected to a fuel gas pipe 504 and oxygen is supplied from an oxygen tank 216 to a hydrogen channel 105.

When power is generated using a reformed gas obtained through a reforming reaction, applying this embodiment to a problem of an increase of CO that occurs when the amount of hydrogen generated is increased drastically will provide the following countermeasures. That is, adopting the above-described configuration makes it possible to mix oxygen generated from a positive electrode plate 203 due to an overcharge reaction during charging or overcharging of a battery 200 with a fuel gas and supply it to a hydrogen electrode 102 of the fuel cell 100. In this way, even if an electrode catalyst of Pt, etc., of the fuel cell 100 adsorbs CO contained in the fuel gas, oxygen introduced together with the fuel gas oxidizes this CO, disassociates it from the electrode catalyst as carbon dioxide and thereby prevent catalyst poisoning.

There is an example of a polymer electrolyte fuel cell where air is introduced into reformed hydrogen using a Ru catalyst to oxidize CO, but in this case, nitrogen in the air causes a secondary problem such as generation of ammonium. This embodiment removes CO using pure oxygen and easily prevents a reduction of the power generation efficiency. In this case, if hydrogen generated from the battery 200 is also mixed with the fuel gas and used, it is possible to avoid wasting hydrogen. Furthermore, mixing pure hydrogen with a reformed gas, which is the fuel gas further, reduces the concentration of carbon dioxide. Thus, this suppresses a reverse reaction at reaction equilibrium shown in the following shift reaction, further reducing the concentration of CO:

(Chemical formula 7)

(Embodiment 3)

Figure 5:
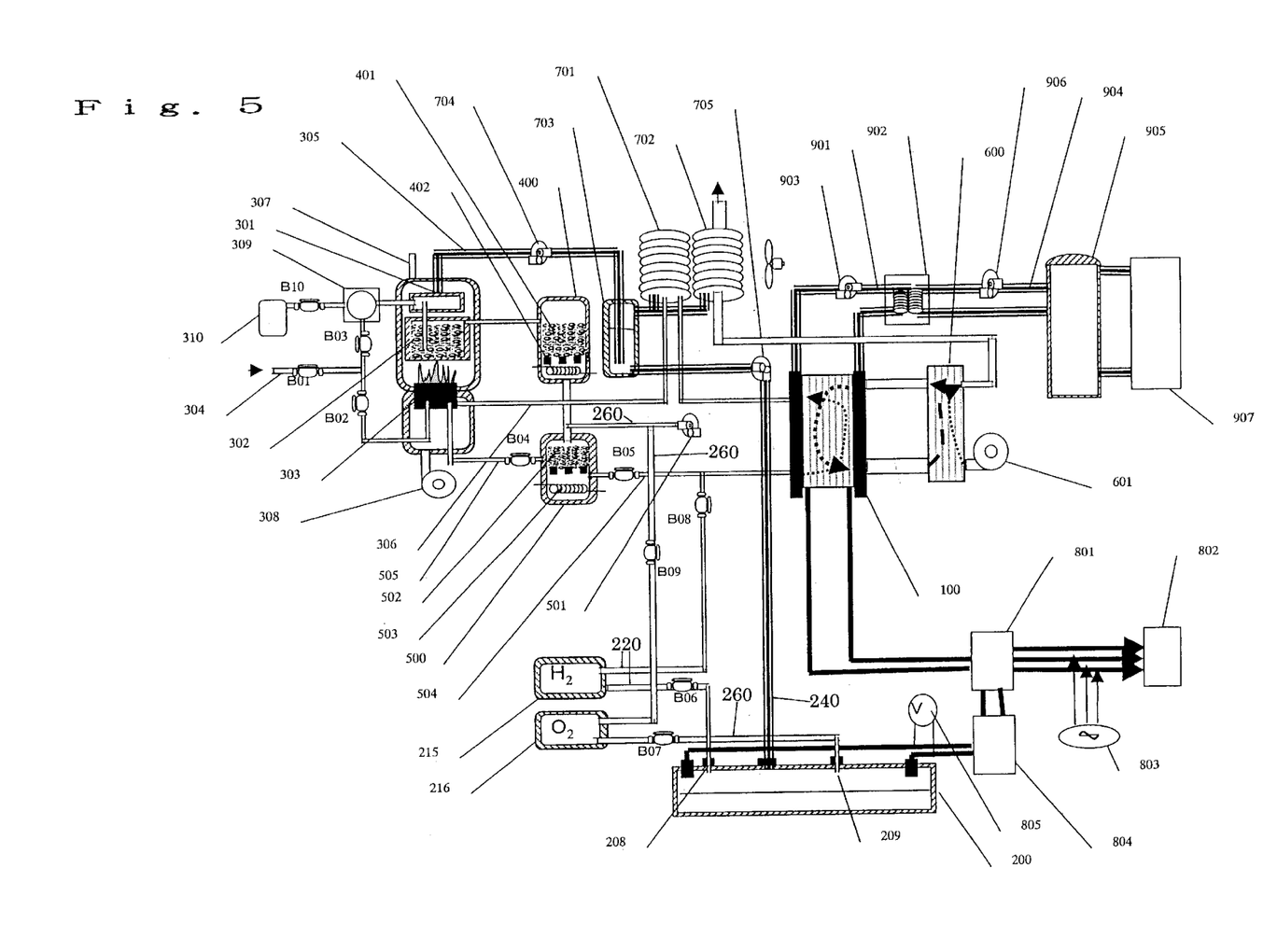
FIG. 5 is a block diagram of a fuel cell system according to Embodiment 3 of the present invention.

FIG. 5 shows a block diagram of Embodiment 3. However, the same components as or components equivalent to those in FIG. 3 are assigned the same reference numerals and detailed explanations thereof will be omitted. In Embodiment 2, the outlet of the oxygen tank 216 is connected to the fuel gas pipe 504 using the oxygen pipe 250 and oxygen is supplied to the hydrogen channel 105. Embodiment 3 adopts a configuration with an oxygen pipe 260 provided between a channel from a transformation section 400 to CO purification section 500 and an oxygen tank 216. This makes it possible to supply oxygen from the oxygen tank 216 to the purification section 500 in such a way as to use oxygen as a substitute for CO reaction air supplied from an air pump 501 or add it thereto.

Applying this embodiment to a problem of increase of CO contained in a reformed gas that occurs when the amount of hydrogen generated at a hydrogen generation section is increased drastically will provide the following countermeasures. That is, since oxygen is supplied to a CO purificating catalyst 502 such as mordenite-Pt inside the CO purification section 500, it is possible to oxidize CO to carbon dioxide using oxygen and remove it and thereby prevent catalyst poisoning.

According to this embodiment, it is possible to reduce the contribution of nitrogen in the air in the reformed gas, and thereby reduce the concentration of the reformed gas and prevent a reduction of the power generation efficiency in the fuel cell 100.

In the above-described embodiments, the fuel cell 100 corresponds to the fuel cell of the present invention, the battery 200 corresponds to the battery of the present invention, the hydrogen tank 215 corresponds to the hydrogen storage section of the present invention and the hydrogen pipe 220 corresponds to the hydrogen supply channel of the present invention. Furthermore, the oxygen pipes 230, 250 and 260 correspond to the oxygen supply channel of the present invention, the oxygen tank 216 corresponds to the oxygen storage section of the present invention. Furthermore, the reformed gas generated by a reforming reaction of the reformer 300 corresponds to the fuel gas of the present invention, the reformer 300 corresponds to the fuel gas generating means of the present invention, the CO purification section 500 corresponds to the CO reducing means of the present invention. Furthermore, the water refilling pipe 240 corresponds to the water supply channel of the present invention. Furthermore, the commercial power supply 803 corresponds to external source of the present invention.

In the above-described explanation, the battery 200 is used as an example because the flood type lead acid battery can obtain all the above-described effects, but a sealed lead acid battery, NiCd battery and NiH battery also generate hydrogen during charging and therefore the same effect can be obtained. Furthermore, the polymer electrolyte fuel cell is used as an example of the fuel cell, but a phosphoric acid type fuel cell and polymer electrolyte fuel cell using hydrogen as a fuel gas also have the same effect in that they flexibly respond to a peak load.

The above-described embodiments of the present invention provide a self-generation system having a fuel cell and battery that improves durability of the battery and fuel cell. It also processes hydrogen generated by an overcharge reaction of the battery safely and uses this hydrogen to flexibly respond to the highest peak power. Furthermore, it complements the amount of discharge of the battery with power generated of stored hydrogen, and thereby reduces the depth of charging/discharging of the battery and improves the durability of the battery for a long period of time. Furthermore, it automatically refills water of the battery to an optimal level, saves time and trouble and also improves durability.

It also improves economical efficiency of the system. That is, even if a power load increases drastically, it can respond to peaks using a combination of the battery and hydrogen power generation, which eliminates the need to have extra equipment and is therefore economical. Even if a power load reduces drastically, hydrogen can be stored with extra power, which eliminates the need to stop power generation immediately. This reduces the size of the battery that makes up for excess or shortage of power and provides an economical system.

Furthermore, it is possible to prevent CO poisoning of the negative electrode of the fuel cell using pure oxygen and hydrogen and thereby improve the durability of the fuel cell itself.

Such an effect is especially noticeable in a combination of an inexpensive flood type battery having a high storage capacity and a polymer electrolyte fuel cell, which is likely to deteriorate due to CO.

Consequently, an enhanced capacity in responding to peak output makes it possible to avoid reception of excessive refilling power from a commercial power supply and thereby has the merit of setting the contracted amount of power and reducing the basic fee. Furthermore, even if excessive power is generated, it is possible to store and use extra electric power in a household instead of selling it to a power company at a low price in a reverse flow, which is economical. With an independent power supply at an estate, etc., the convenience obtainable by an enhanced peak responding capacity further increases.

As is apparent from the above-described explanations, the present invention can provide a low-cost fuel cell system that allows highly responsive operation and a method of operating such a system.

What is claimed is:

1. A fuel cell system comprising:
   a fuel cell for generating power, that (1) is supplied an oxidizer containing oxygen to a positive electrode and (2) is supplied a fuel gas containing hydrogen to a negative electrode;
   a battery including at least water as an electrolyte; and
   a hydrogen supply channel that supplies hydrogen generated from said battery to said fuel cell.

2. The fuel cell system according to claim 1, further comprising a hydrogen storage section in said hydrogen supply channel, which stores hydrogen generated from said battery.

3. The fuel cell system according to claim 1 or 2, wherein said hydrogen supply channel is connected to the negative electrode of said fuel cell.

4. The fuel cell system according to claim 1, further comprising an oxygen supply channel that extracts oxygen generated from said battery.

5. The fuel cell system according to claim 4, further comprising an oxygen storage section provided at a midpoint in said oxygen supply channel, which stores oxygen generated from said battery.

6. The fuel cell system according to claim 4, wherein said oxygen supply channel is connected to the positive electrode of said fuel cell.

7. The fuel cell system according to claim 4, wherein said oxygen supply channel is connected to the negative electrode of said fuel cell.

8. The fuel cell system according to claim 4, further comprising:
   fuel gas generating means of generating said fuel gas by allowing fuel containing at least carbon to produce a steam reforming reaction with water; and
   CO reducing means of reducing carbon monoxide contained in said fuel gas by converting the carbon monoxide into carbon dioxide through oxidation catalyst,
   wherein said oxygen supply channel is connected to said CO reducing means.

9. The fuel cell system according to claim 1, further comprising a water supply channel that supplies water generated during power generation by said fuel cell to said battery.

10. The fuel cell system according to claims 1 or 4, wherein said hydrogen and/or said oxygen is generated from said battery by allowing said battery to produce an overcharge reaction.

11. The fuel cell system according to claim 10, wherein said overcharge reaction is produced through output from said fuel cell.

12. The fuel cell system according to claim 10, wherein said overcharge reaction is produced through power from an external source in grid connect with said fuel cell.

13. The fuel cell system according to claim 1, wherein said battery is a flood type lead acid battery.

14. The fuel cell system according to claim 1, wherein said fuel cell is any one of polymer electrolyte type, direct methanol type or solid electrolyte type.

15. A method of operating a fuel cell system comprising the steps of:
   (a) supplying an oxidizer containing oxygen to a positive electrode of said fuel cell, supplying a fuel gas containing hydrogen to a negative electrode of said fuel cell and generating power,
   (b) allowing a battery including at least water as an electrolyte to produce overcharge reaction, thereby to generate from said battery at least hydrogen for supplying to said fuel cell.

16. The method of operating a fuel cell system according to claim 15, wherein said overcharge reaction is produced when the output of said fuel cell is not insufficient with respect to a load of said fuel cell.

17. The method of operating a fuel cell system according to claim 15, wherein the step (a) includes supplying said hydrogen when the output of said fuel cell is not insufficient with respect to the load of said fuel cell.

18. The method of operating a fuel cell system according to claim 17, wherein the step (a) includes supplying said hydrogen when operation of said fuel cell is started.

19. The method of operating a fuel cell system according to claim 15 or 16, further comprising a step of supplying oxygen generated together with said hydrogen from said battery through said overcharge reaction to said fuel cell.

20. The method of operating a fuel cell system according to claim 15, further comprising a step of supplying water generated during power generation by said fuel cell as electrolytic water to said battery.

21. The method of operating a fuel cell system according to claim 15, wherein the step (b) includes producing said overcharge reaction through the output from said fuel cell or power of an external source in grid connect with said fuel cell.

* * * * *

UNITED STATES PATENT AND TRADEMARK OFFICE
CERTIFICATE OF CORRECTION

PATENT NO.    : 6,727,011 B2
DATED         : April 27, 2004
INVENTOR(S)   : Jiro Suzuki et al.

It is certified that error appears in the above-identified patent and that said Letters Patent is hereby corrected as shown below:

Title page,
Item [56], References Cited, FOREIGN PATENT DOCUMENTS, insert
-- JP 05-182675, 7/1993 --.

Signed and Sealed this

Twenty-first Day of September, 2004

JON W. DUDAS
*Director of the United States Patent and Trademark Office*